United States Patent
Fu

(10) Patent No.: US 6,293,755 B1
(45) Date of Patent: Sep. 25, 2001

(54) ELECTRIC FAN ADJUSTABLE SUPPORT

(76) Inventor: Chiac Fu, P.O. Box 63-99, Taichung 406 (TW)

( * ) Notice: Subject to any disclaimer, the term of this patent is extended or adjusted under 35 U.S.C. 154(b) by 0 days.

(21) Appl. No.: 09/491,085

(22) Filed: Jan. 24, 2000

(51) Int. Cl.[7] ............................................. F04D 29/26
(52) U.S. Cl. .................................... 416/244 R; 416/246
(58) Field of Search ................................ 415/126, 220, 415/121.2; 416/244 R, 247 R, 246

(56) References Cited

U.S. PATENT DOCUMENTS

| | | | |
|---|---|---|---|
| Re. 34,551 | * | 2/1994 | Coup et al. .................... 415/121.2 |
| 1,597,871 | * | 8/1926 | Reynders ........................... 416/246 |
| 2,652,974 | * | 9/1953 | Fettel ................................. 416/246 |
| 3,713,346 | * | 1/1973 | Chamberlain et al. ................ 74/42 |
| 4,732,539 | * | 3/1988 | Shin-Chin ......................... 416/100 |
| 5,558,501 | * | 9/1996 | Wang et al. .................... 416/244 R |
| 6,015,262 | * | 1/2000 | Huang ............................... 416/100 |

* cited by examiner

Primary Examiner—Christopher Verdier
Assistant Examiner—Ninh Nguyen

(57) ABSTRACT

An electric fan includes a block disposed on a base, a coupler having a bracket pivotally secured to the block at a pivot shaft, a motor secured on the other end of the coupler, a fan device attached to the spindle of the motor for being driven by the motor. means for securing the coupler to the block. A spring-biased projection is received in the block and engaged with the bracket for adjustably securing the coupler to the block. A net device is secured onto the middle portion of the motor at a peripheral flange.

9 Claims, 4 Drawing Sheets

ELECTRIC FAN ADJUSTABLE SUPPORT

BACKGROUND OF THE INVENTION

1. Field of the Invention

The present invention relates to a fan, and more particularly to an electric fan having an adjustable support.

2. Description of the Prior Art

Typical electric fans comprise a fan motor directly and rotatably secured on top of a support, such that the fan motor may be rotated about a vertical axis of the support only. In addition, the fan motor and the electric fan may not be easily disassembled for storing or transportation purposes.

The present invention has arisen to mitigate and/or obviate the afore-described disadvantages of the conventional electric fans.

SUMMARY OF THE INVENTION

The primary objective of the present invention is to provide an electric fan having a configuration to be easily assembled and disassembled.

In accordance with one aspect of the invention, there is provided an electric fan comprising a block disposed on a base, a coupler including a first end pivotally secured to the block at a pivot shaft, a motor secured on a second end of the coupler, a fan device attached to a spindle of the motor, and means for securing the coupler to the block.

The block includes a stud provided on top thereof, the first end of the coupler is pivotally secured to the stud of the block at the pivot shaft. The first end of the coupler includes a bracket pivotally secured to the block at the pivot shaft. The bracket includes an inverted U-shaped structure. The bracket includes at least one cavity formed therein, the securing means includes a spring-biased projection received in the block and engaged in the cavity of the bracket for securing the coupler to the block.

The block includes a peripheral groove formed therein, and a spring is received in the peripheral grove of the block and engaged between the block and the coupler for applying a resilient force against the coupler and the motor.

The motor includes a middle peripheral flange for supporting a net cover. A bearing device is further provided for rotatably securing the motor to the coupler. The block includes at least one orifice formed therein, the base includes at least one rod extended therefrom and engaged into the orifice of the block for securing the block on the base.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
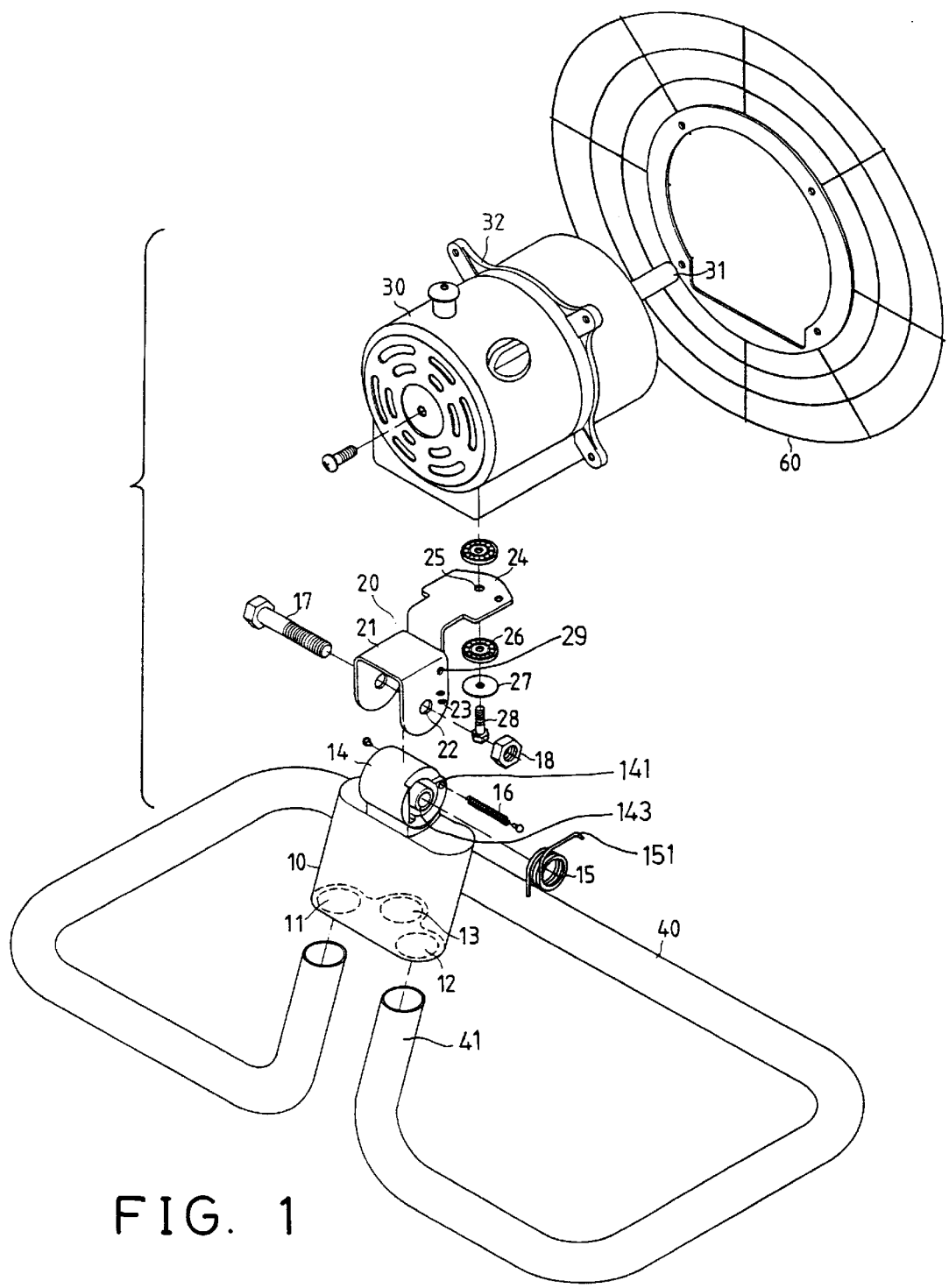
FIG. 1 is an exploded view of an electric fan in accordance with the present invention.
Figure 2:
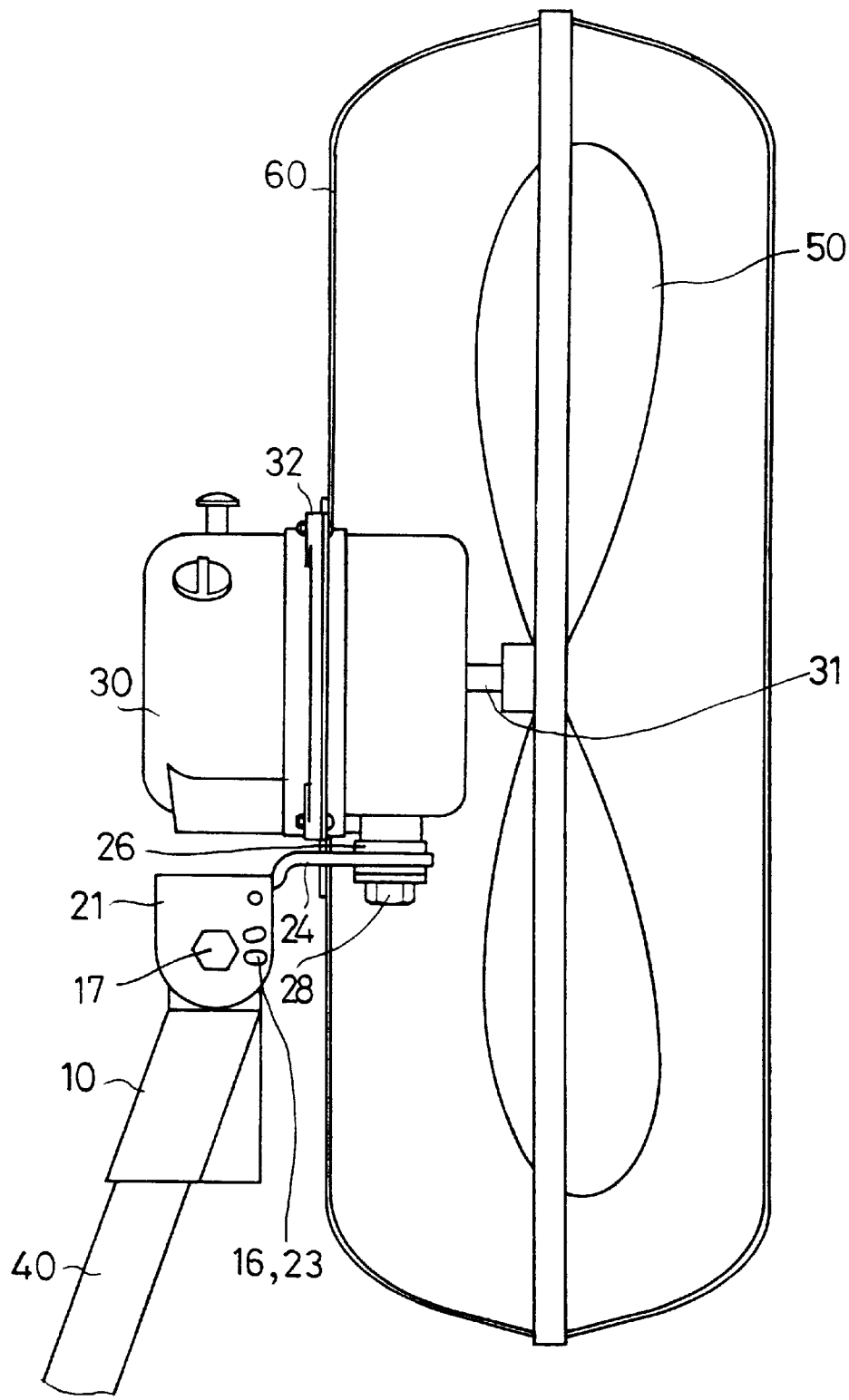
FIG. 2 is an enlarged partial side schematic view of the electric fan.
Figure 4:
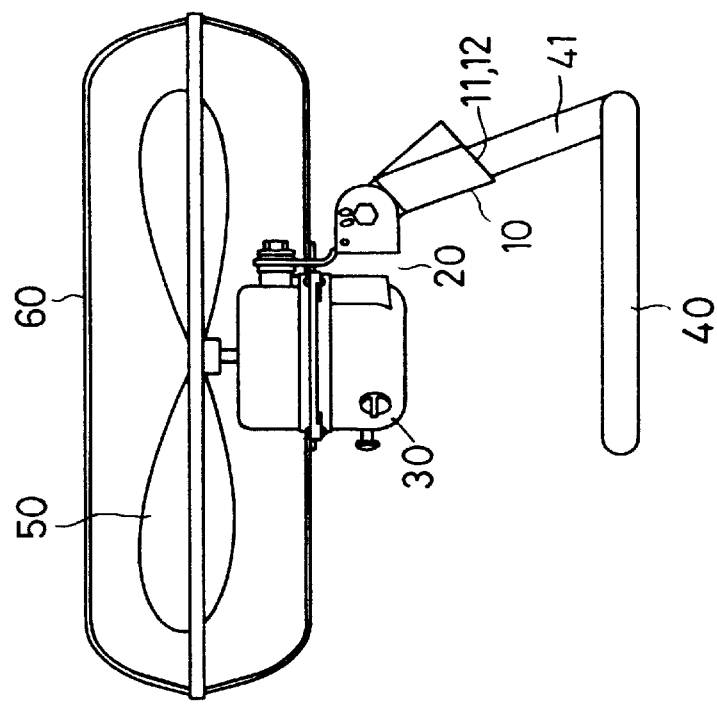
FIGS. 3, 4, 5 are side views illustrating the operation of the electric fan.
Figure 3:
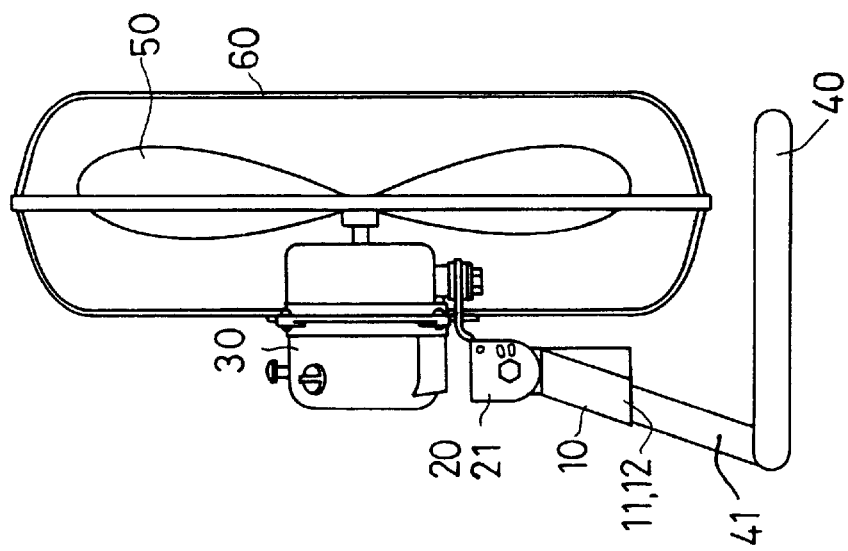
Figure 5:
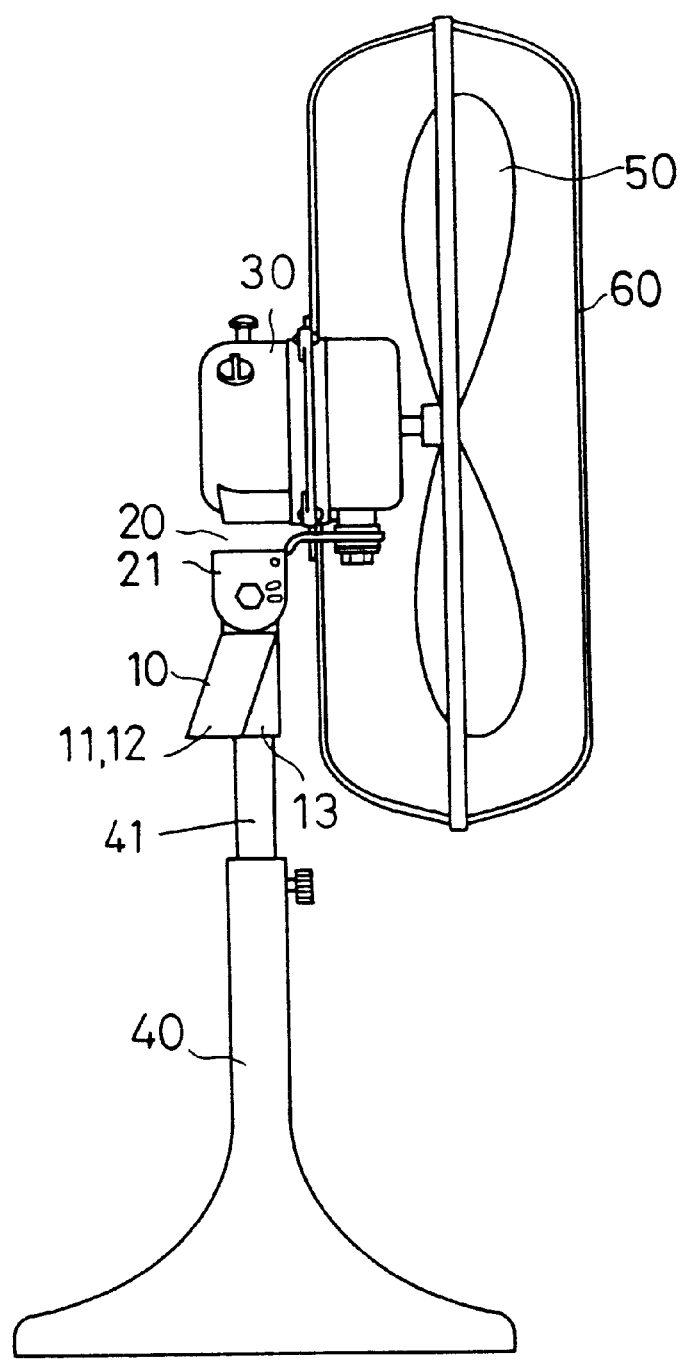

Referring to the drawings, and initially to FIGS. 1 and 2, an electric fan in accordance with the present invention comprises a block 10 including one or more orifices 11, 12, 13 formed in the bottom portion thereof for receiving one or more rods 41 of a base 40 and for allowing the block 10 to be supported on the base 40. For example, as shown in FIG. 1, the base 40 includes two rods 41 extended upward therefrom for engaging into the orifices 11, 12 of the block 10. As shown in FIGS. 3 and 4, the base 40 may include only one single rod 41 extended upward therefrom for engaging into either of the orifices 11, 12 of the block 10. Or, as shown in FIG. 5, the base 40 may include a single rod 41 extended upward therefrom for engaging into the orifice 13 of the block 10. The block 10 includes a stud 14 formed or provided on top thereof and having a hole 141 formed therein for receiving a spring-biased projection 16 therein and having a peripheral groove 143 formed therein for receiving a coil spring 15.

A coupler 20 includes an inverted U-shaped bracket 21 formed on one end thereof and engaged onto the stud 14 and pivotally secured onto the stud 14 with a pivot shaft 17 which is engaged through the holes 22 of the bracket 21 and which is threaded with a nut 18 that may secure the pivot shaft 17 to the coupler 20 and the stud 14. The spring 15 includes a leg 151 engaged into a hole 29 of the bracket 21 for applying a resilient force against the bracket 21. The bracket 21 includes one or more holes or cavities 23 formed therein for receiving the spring-biased projection 16 which may position the bracket 21 to the stud 14 of the block 10.

A longitudinal tool may be engaged into the holes or cavities 23 of the bracket 21 for disengaging the spring-biased projection 16 from the bracket 21 and for allowing the bracket 21 to be rotated and adjusted relative to the stud 14 of the block 10. The spring-biased projection 16 may engage into the other holes or cavities 23 of the bracket 21 for securing the bracket 21 to the stud 14 of the block 10 at the required angular position when the longitudinal tool is disengaged from the holes or cavities 23 of the bracket 21. The coupler 20 includes an extension 24 extended from the bracket 21 for supporting a motor 30 which is rotatably secured and supported on the extension 24 with one or more bearings 26, one or more washers 27, and one or more fasteners 28 which is engaged through the hole 25 formed in the extension 24 of the coupler 20. The motor 30 may thus be rotatably secured to the coupler 20 at a pivot axle (28) formed by the fastener 28. The motor 30 includes a spindle 31 extended therefrom. A fan device 50 is attached to the spindle 31 for being rotated and driven by the motor 30. The motor 30 includes a middle portion having a peripheral flange 32 extended outward therefrom for attaching a net cover 60 thereto.

In operation, as shown in FIG. 3, the middle portion of the motor 30 is supported on the coupler 20 such that the motor 30 and the center of gravity of the electric fan may be arranged and provided in the center of the base 40. As shown in FIG. 4, when the coupler 20 is changed to the other angular position relative to the stud 14 of the block 10, the motor 30 and the fan device 50 may also be supported in the center of the base 40 and the fan device 50 may be faced upward for blowing the air upward. The motor 30 may thus be adjustably secured relative to the stud 14 of the block 10 by adjusting the coupler 20 relative to the stud 14 of the block 10. The spring 15 may bias the motor 30 and the fan device 50 upward for offsetting a portion of the weight of the motor 30 and the fan device 50 on the coupler 20.

Accordingly, the electric fan in accordance with the present invention includes a configuration to be easily assembled and disassembled and for allowing the motor to be adjusted relative to the support.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric fan comprising:

a base, a block disposed on said base, a coupler including a first end pivotally secured to said block at a pivot shaft, and including a second end, a motor secured on said second end of said coupler and including a spindle, a fan device attached to said spindle of said motor for being driven by said motor, means for securing said coupler to said block, and means for offsetting a weight of said motor and said fan device.

2. The electric fan according to claim 1, wherein said block includes a stud provided on top thereof, said first end of said coupler is pivotally secured to said stud of said block at said pivot shaft.

3. The electric fan according to claim 1, wherein said first end of said coupler includes a bracket pivotally secured to said block at said pivot shaft.

4. The electric fan according to claim 3, wherein said bracket includes an inverted U-shaped structure.

5. The electric fan according to claim 3, wherein said bracket includes at least one cavity formed therein, said securing means includes a spring-biased projection received in said block and engaged in said at least one cavity of said bracket for securing said coupler to said block.

6. The electric fan according to claim 1, wherein said block includes a peripheral groove formed therein, said offsetting means includes a spring received in said peripheral grove of said block and engaged between said block and said coupler for applying a resilient force against said coupler and said motor.

7. The electric fan according to claim 1, wherein said motor includes a middle portion having a peripheral flange provided thereon, said electric fan further includes a net cover attached to said motor at said peripheral flange.

8. An electric fan comprising:

a base, a block disposed on said base, a coupler including a first end pivotally secured to said block at a pivot shaft, and including a second end, a motor secured on said second end of said coupler and including a spindle, a fan device attached to said spindle of said motor for being driven by said motor, means for securing said coupler to said block, and bearing means for rotatably securing said motor to said coupler.

9. An electric fan comprising:

a base, a block disposed on said base, a coupler including a first end pivotally secured to said block at a pivot shaft, and including a second end, a motor secured on said second end of said coupler and including a spindle, a fan device attached to said spindle of said motor for being driven by said motor, and means for securing said coupler to said block, wherein said block includes at least one orifice formed therein, said base includes at least one rod extended therefrom and engaged into said at least one orifice of said block for securing said block on said base.

* * * * *